United States Patent Office 3,368,467
Patented Feb. 13, 1968

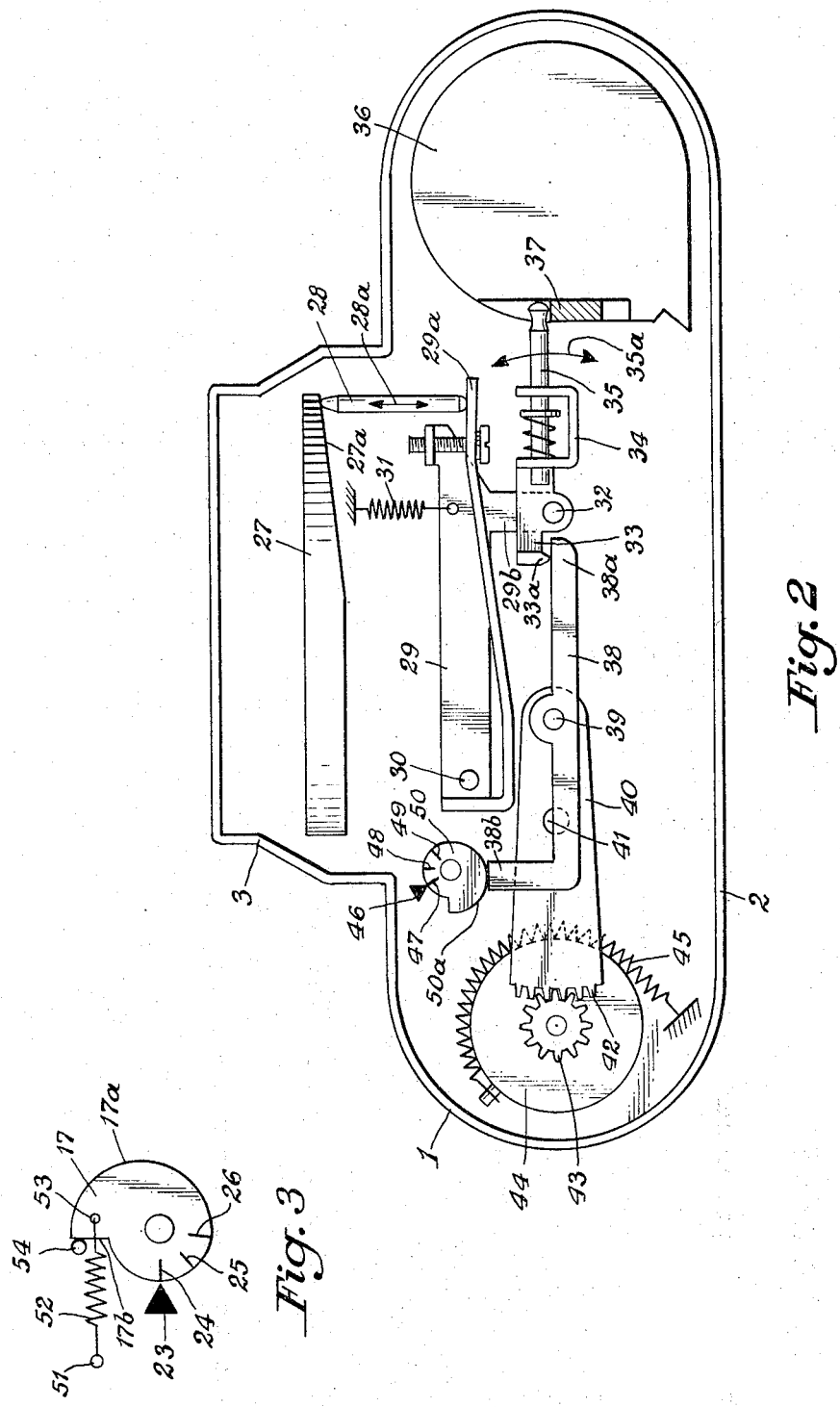

3,368,467
PHOTOGRAPHIC CAMERA WITH AUTOMATIC
FILM SPEED ADJUSTMENT
Johann Hahn, Stuttgart, Germany, assignor to Zeiss Ikon
Aktiengesellschaft, Stuttgart, Germany
Filed Mar. 24, 1965, Ser. No. 442,385
Claims priority, application Germany, Apr. 4, 1964,
Z 10,746
6 Claims. (Cl. 95—10)

ABSTRACT OF THE DISCLOSURE

A photographic camera with a coupled exposure meter and a manually operated correction device for introducing certain corrections in the exposure value adjustment of the exposure meter, said correction device includes a member which is operatively coupled with the other control means of the camera in such a manner that a number of exposure values, including an automatically introduced film speed value and, if desired, a preadjusted exposure factor, are superimposed upon the manually corrected value to obtain the final exposure setting.

---

This invention relates to a photographic camera having a coupled exposure meter or other automatic exposure control devices.

It is the object of this invention to provide means for this type of camera, which introduces automatically the speed value of the film loaded into the camera into the exposure meter gearing or other exposure adjusting device.

The object of an automatic introduction of the film speed into the camera is obtained, in accordance with this invention, in that the film magazine or film cartridge to be inserted in the camera is provided with a film speed indicating notch or film speed indicating cam which is engaged by a lever of a measuring system or an exposure adjusting device. This notch or cam is arranged in a predetermined position and introduces a film speed adjustment into the light measuring and exposure control means of the camera.

This invention makes it possible for the operator of the camera to introduce certain corrections into the exposure value adjustment mechanism by providing a manually operated correction device that is properly calibrated and marked, and which includes a member which is operatively coupled with the other control mechanism of the camera in such a manner that a number of exposure values, including the automatically introduced film speed value, and, if desired, also a preadjusted exposure factor, are superimposed upon the manually introduced correction value to produce the final camera setting.

An essential constructional feature of the camera according to this invention includes a correction member having an operating portion in the form of a control cam operatively connected to a camera member which, on the one hand, is connected to a scanning lever for film speed introduction and, if desirable, to a presettable exposure adjusting member; and, on the other hand, is connected to a device which, in dependence of the exposure value measured, determines by means of the scanned film speed and, if applicable, by means of a preadjusted exposure factor, the value of one or all exposure factors combined.

In operating the camera of this invention, the exposure time or shutter speed is preferably set first while the corresponding proper diaphragm aperture setting is obtained either by means of coupling with the light measuring instrument or automatically. In this procedure, the control cam of the correction member acts upon a rotatable or movable lever which in its attained position stores the exposure time or shutter speed value as well as the automatically introduced film speed value and is in direct or indirect operative connection with the measuring instrument of the exposure meter. The correction member is provided with a standard marking and at least one poor-weather marking or filter-factor marking on a scale located opposite a single index mark fixed on the camera casing. In order to be able to consider a greater number of filter factors, it is advisable to arrange several correction marks in addition to the standard mark. If now a poor-weather mark or a filter-factor mark on the correction member is adjusted opposite said fixed index, such setting will become superposed upon the movement of the aforesaid lever, thereby changing its position from that attained by shutter speed and film speed value introduction. The sum of all these three values or inputs will be entered by the lever, either directly or indirectly, i.e., by an additional intermediate member, into the exposure meter. The exposure meter comprises an instrument which is rotatably arranged as a whole about its center axis, so that the input of the three aforementioned factors may be entered, for example, by a rack and pinion drive. The deflection of the indicator of the measuring instrument will now depend on the magnitude of the factors introduced which will cause a corresponding rotary position of the galvanometer, and additionally will depend upon the prevailing and measured light condition of the object to be photographed. In a camera provided with a coupled diaphragm setting, the aperture of the diaphragm is set by adjusting the indicating hand of the measuring instrument to a position opposite a fixed mark or index or by superposing a follow-up indicator and the instrument indicator whereby these compensating movements are transmitted to the diaphragm mechanism. In cameras with automatic diaphragm setting, the value of the exposure factor is formed in that the deflected measuring instrument pointer, also influenced in its position by corrections introduced as above described, is arrested in this indicating position by the camera release action and is scanned in this position by a simultaneously actuated follow-up mechanism interlocked with the diaphragm setting mechanism.

Another object of this invention is to keep the correction setting member under the tension of a spring so that the manually adjusted correction values will be canceled after the camera has been released in that the spring returns the correction member automatically to its initial or zero position. In this manner the correction values are not erroneously retained in the mechanism.

These and other features and advantages of the present invention will be better understood from the following description of two preferred embodiments given with reference to the accompanying drawings, in which:

FIG. 2 is a similar view of a modified embodiment showing the elements essential for operation with roll film cartridges; and FIG. 3 illustrates a manually adjustable correction member which is returned by a spring to its initial or zero position.

Figure 1:
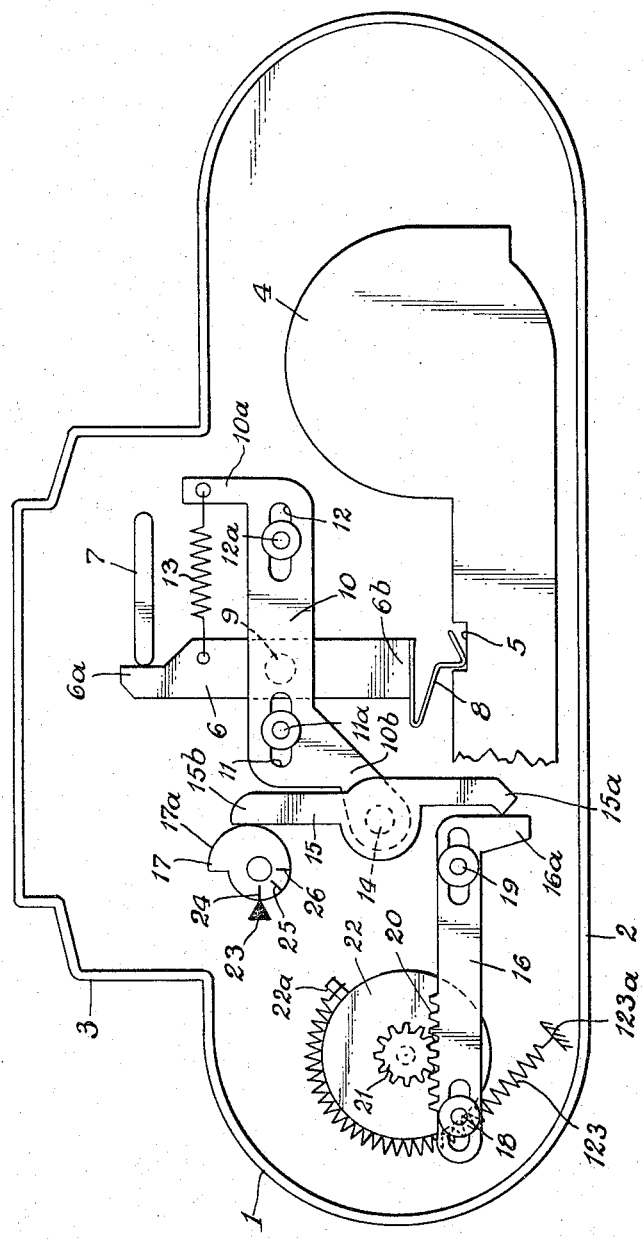
FIG. 1 is a top view of a camera equipped for automatic film speed introduction with top plate removed to show in plan view the mechanism allowing also for input of poor-weather and filter factor corrections whereby only the elements essential for the invention in operation with film magazines are shown.

Referring to FIG. 1 of the drawing, the camera housing 1 is provided with a rear wall 2 and on the opposite wall with an objective mount 3 for a photographic objective. The camera is provided with a compartment for receiving a film containing member, such as a magazine 4 which is provided with means making it possible to introduce the film speed of the particular film contained in the magazine automatically into the camera mechanism. In the present embodiment this means consists of a film speed notch 5 located on the magazine in accordance with the type and speed of film contained therein. The position of a shutter speed adjusting transmission member 7 depends on the preset exposure time or shutter speed. The customary shutter speed adjusting ring is not shown since the function of this element is well known and is not essential for the understanding of this invention. The shutter speed adjusting transmission member 7 is urged against the one end 6a of a double-armed lever 6 pivoted between its ends about pin 9. The other end 6b of the lever 6 is provided with a scanning element for the notch 5. This scanning element has the form of a somewhat V-shaped leaf spring 8 one angularly bent portion of which enters the notch 5. The rotary position of lever 6 thus depends on the value of the preset shutter speed and also on the position of the film speed notch 5 which in turn is a function of the film speed of the particular film contained in magazine 4.

The pivot pin 9 of the lever 6 is carried by a slide bar 10 which extends crosswise of the lever 6 and is slidably arranged by having oblong holes 11 and 12 through which pins 11a and 12a extend. A right-angled extension 10a on one end of the slide bar 10 is connected to lever 6 by a helical spring 13 while an angular extension 10b on the other end of the slide bar 10 carries a pin 14 on which a lever 15 is pivoted between its ends. The slide bar 10 in this position stores not only the introduced film-speed of the film inserted in the camera but also the pre-adjusted shutter speed.

The lever 15, carried rotatably by the pin 14 of the slide bar 10 engages with one of its extremities 15b a control cam 17a of the correction member 17 which is provided on its face with markings 24, 25 and 26 visible from the outside through a window provided in the camera top wall. Any one of these marks can be brought in alignment with a fixed index mark 23 engraved or otherwise provided on the camera housing. The mark 24 is a standard mark because it is set in alignment with index mark 23 whenever neither a poor-weather factor nor a filter factor correction is to be taken into account for the intended exposure. Therefore, a setting of standard mark 24 on index 23 represents a zero setting of the correction member 17. A setting of the correction mark 25 on index 23 indicates that a correction is to be introduced, for instance, to compensate for poor-weather or back lighting conditions, or for a filter factor, say, for a filter factor 2. A setting of the mark 26 in alignment with the fixed index 23 generally means a compensation for a filter having a filter factor of about 4. In the position shown in FIG. 1, the correction member 17 is in its zero position, which means that the lever 15 is not additionally angularly moved by control cam 17a.

In the position of the parts just described, there is stored in the other lever end 15a only the sum of two inputs, namely the preselected shutter-speed setting and the result of automatic film-speed scanning at the film-speed notch 5 on the magazine 4. The lever end 15a is urged against a slide bar 16 which, owing to oblong-slot mountings 18, 19 can reciprocate along a predetermined distance parallel to the slide bar 10. The operative engagement of the levers is obtained by the helical spring 13 arranged under tension between lever 6 and the slide bar 10.

The slide bar 16 is provided with rack teeth 20 which mesh with a pinion 21 mounted on the shaft of a measuring instrument 22 which as a whole is rotatably arranged about the axis of said shaft. The measuring instrument 22 receives a certain torsional force from a helical spring 123 which is attached with one end to a radial projection 22a of the housing of the measuring instrument, extends around a portion of said housing and is secured with its other end to the camera housing at 123a.

Whenever the lever end 15a carries within it, as evidenced by the degree of rotation of lever 15, solely the sum of the two inputs, namely the shutter-speed setting and the automatic film-speed scanning, then as the result of the movement of the slide bar 16, the rack teeth 20 and pinion 21 a predetermined rotative movement of the measuring instrument takes place, whose indicator in addition to its deflection caused by the exposure value is caused to make an additional deflection. To this resulting deflection there is added a still further deflection whenever an adjustment of the correction member 17 is made. Owing to such an adjustment the lever 15 swings in clockwise direction from the position shown in the drawing, and its end 15a pushes against one end of the slide bar 16 with the result that an additional clockwise rotation of measuring instrument 22 is effected. Such movement in turn causes in a camera having a coupled diaphragm adjustment, a corresponding movement of a follow-up indicator, if such is employed, or causes a corrective rearward movement of the measuring instrument until coincidence between the indicator of the measuring instrument and the follow-up pointer indicator is established, or alignment with a fixed mark is reached. In cameras with automatic adjustment of one or both exposure factors, the value of the coupled exposure setting factor is, of course, correspondingly changed. This means that as a consequence of indicator scanning, a follow-up member put in motion by actuation of the camera release, must travel a corresponding distance until it strikes the stop established by the previously arrested instrument indicator.

Now, whenever a correction is entered by setting member 17 on a correction mark, the lever 15 and particularly its end 15a stores in its adjusted position all three inputs, namely the preset shutter speed, the automatic film-speed scanning value, and the introduced correction values. In the same manner the location of slide bar 16 depends upon the position of lever end 15a which is a measure of the sum of all introduced inputs.

In the embodiment of the invention disclosed in FIG. 2, the reference numerals 1, 2 and 3 designate as heretofore the camera housing, its rear wall and objective mount respectively. However, the film magazine has been replaced by a film cartridge 36 which, similarly as the magazine in FIG. 1 is provided with means for automatic scanning and introduction into the camera mechanism of the film-speed value of the film contained in the cartridge. In this case, the means for such introduction comprises a film-speed cam 37 whose position is an indication of the speed of the particular film contained in the cartridge.

In this modified embodiment of the invention a manually adjustable speed adjusting member 27 on the objective mount is provided with a control cam 27a which engages one end of a reciprocable pin 28 whose reciprocatory movements are indicated by a double-headed arrow 28a. The other end of the pin 28 is urged against the end 29a of a horizontally disposed lever 29 pivoted near its other end at 30. A tension spring 31 secured with one end to the camera frame and with its other end to the lever 29 keeps the pin 28 in steady contact with the cam 27 and the end 29a of the lever 29.

A right-angled projection 29b on the lever 29 carries the pivot pin 32 of a lever 33 which at one end is formed into a yoke 34 which serves as bearing ember for a scanning pin 35. This scanning pin 35 cooperates with the film value cam 37 on the cartridge 36. The pin 35 together with the lever 33 in which it is mounted is capable to swing about the pivot pin 32 in an arc indicated in the drawing by a slightly curved double-headed arrow 35a. Since in different positions of the film-speed cam an axial motion of the scanning pin 35 relative to lever 33 and the yoke-shaped bearing member 34 will occur an axial resilient mounting of the pin 35 in the yoke 34 is provided as shown.

From the above it will be apparent that the rotary position of the lever 33 is affected by the preselected shutter speed setting transmitted to it by the lever 29, and the result of automatic film-speed scanning transmitted to it by the pin 35. Thus, the lever 33 stores these values in its rotary position and transmits them to its end 33a to a lever 38 pivotally mounted between its ends at 39. The lever end 33a of lever 33 is urged against the lever 38a of the mentioned lever 38 whose other right-angled end 38b abuts against a rotary control cam 50a of a correction member 50. This correction member 50 is similar to the one shown in FIG. 1 and is shown here also in its zero setting. The fixed index mark 46 on the camera housing and the markings 47 to 49 on the correction member correspond in their arrangement and significance to the marks 23 to 26 shown in FIG. 1.

The pivot pin 39 of lever 38 is carried by a toothed segment 40 pivotally mounted between its ends on pin 41 fixedly secured in the camera housing. The teeth 42 on one end of the segment 40 mesh with a pinion 43 that forms an integral part of the measuring instrument 44 which as a whole unit is rotatably mounted about the axis of rotation of the pinion 43. The spring 45, extending partly around the circular housing of instrument 44, serves the same purpose as the spring 123 employed in the embodiment shown in FIG. 1.

Whenever the lever 38 and the toothed segment 40 receive only the inputs of preset shutter speed value and the result of automatic film-speed scanning, these inputs cause certain rotary adjustments of the lever 38 and the toothed segment 40, which adjustments in turn result in a certain rotary adjustment of the circular measuring instrument 44 about its axis of rotation. If now, for reason of making a poor-weather or back-lighting exposure, or for reason of a filter application, a further correction must be made, there is added to the two aforementioned inputs the input of the disclosed correction mark setting. Such setting becomes effective in a certain rotation of the rotary correction member 50 in counter-clockwise direction, which results in a downward movement (as viewed in the drawing) of the lever end 38b, and a clockwise rotation of toothed segment 40 about its pivot pin 41, and results finally in an additional rotation to a small degree of measuring instrument 44 in counter-clockwise direction. Thus, the lever 38 and the toothed segment 40 store in this condition three input values which are transmitted to the measuring instrument as set forth above. The effects of the additional deflection of the measuring instrument indicator, in view of the total degree of rotation of the instrument, are the same as described with reference to the embodiment shown in FIG. 1.

FIG. 3 discloses a preferred spring biased arrangement of the correction member 17 which is urged by a spring 52 to its normal zero position indicated by the alinement of its graduation mark 24 with the fixed index 23. The spring 52 is attached with one end to a fixed point 51 in the camera casing and with its other end to a pin 53 on the rotatable correction member 17 so that a face 17b thereof is urged into engagement with a fixed pin 54. In place of the tension spring 52 also a torsion spring extending around the axis of rotation of the correction member 17 may be used. The spring 52 has the tendency to keep or return the adjusted correction member 17 in its initial or zero position.

What I claim is:

1. In a photographic camera provided with an exposure meter which is operatively coupled with a shutter speed adjusting means and a diaphragm adjusting means, a camera casing provided with a compartment for receiving a film containing member, a measuring instrument forming a part of said exposure meter, a film speed indicating means on said film containing member, and operative connection between said shutter speed adjusting means and said measuring instrument for transmitting a change of adjustment of said shutter speed adjusting member to said measuring instrument, means operatively connecting said film speed indicating means with said operative connection for automatically modifying the operation thereof in accordance with said film speed indicating means and superimposing a corresponding modifying action on said measuring instrument when said film containing member is inserted into said compartment of said camera casing, and a manually adjustable exposure modifying member (17) operatively connected with said operative connection for additionally modifying the action of said operative connection on said measuring instrument.

2. In a photographic camera provided with an exposure meter which is operatively coupled with a shutter speed adjusting means and a diaphragm adjusting means, a camera casing provided with a compartment for receiving a film containing member, a measuring instrument forming a part of said exposure meter, a film speed indicating means on said film containing member, an operative connection between said shutter speed adjusting means and said measuring instrument for transmitting a change of adjustment of said shutter speed adjusting member to said measuring instrument, and means operatively connecting said film speed indicating means with said operative connection for automatically modifying the operation thereof in accordance with said film speed indicating means and superimposing a corresponding modifying action on said measuring instrument when said film containing member is inserted into said compartment of said camera casing, said operative connection including a lever (6) pivotally mounted between its ends on a longitudinally movable slide bar (10) which latter is operatively connected with a rack and pinion mechanism (20, 21) which is connected with said measuring instrument (22) to rotate the same, one end of said lever being engaged by said shutter speed adjusting means (7) to be rotated thereby while the other end of said lever engages said film speed indicating means (5) on said film containing member (4).

3. In a photographic camera provided with an exposure meter which is operatively coupled with a shutter speed adjusting means and a diaphragm adjusting means, a camera casing provided with a compartment for receiving a film containing member, a measuring instrument forming a part of said exposure meter, a film speed indicating means on said film containing member, an operative connection between said shutter speed adjusting means and said measuring instrument for transmitting a change of adjustment of said shutter speed adjusting member to said measuring instrument, and means operatively connecting said film speed indicating means with said operative connection for automatically modifying the operation thereof in accordance with said film speed indicating means and superimposing a corresponding modifying action on said measuring instrument when said film containing member is inserted into said compartment of said camera casing, said operative connection including a lever (6) pivotally mounted between its ends on a longitudinally movable slide bar (10) which latter is operatively connected with a rack and pinion mechanism (20, 21) which is connected with said measuring instrument (22) to rotate the same, one end of said lever being engaged by said shutter speed adjusting means (7) to be rotated thereby while the other end of said lever engages said film speed indicating means (5) on said film containing member (4), and a manually adjustable exposure modifying member (17) operatively connected with said operative connection for additionally modifying the action of said operative connection on said measuring instrument, said manually adjustable exposure modifying member including a rotatable cam (17a) engaging one end of a lever (15) pivotally supported between its ends by said slide bar (10), the other end of said last named lever engaging said rack and pinion mechanism which rotates said measuring instrument.

4. A photographic camera according to claim 2, including a spring means (13) connecting the end of the lever (6) engaged by said shutter speed adjusting means with one end of said slide bar (10) to maintain said end of the lever in engagement with said shutter speed adjusting means (7).

5. A photographic camera according to claim 3, in which said rotatable cam (17a) is provided with scale divisions adjustable relatively to a fixed index mark on the camera casing, said scale divisions indicating an initial position, at least one poor light condition and at least one filter factor position.

6. In a photographic camera provided with an exposure meter which is operatively coupled with a shutter speed adjusting means and a diaphragm adjusting means, a camera casing provided with a compartment for receiving a film containing member, a measuring instrument forming a part of said exposure meter, a film speed indicating means on said film containing member, an operative connection between said shutter speed adjusting means and said measuring instrument for transmitting a change of adjustment of said shutter speed adjusting member to said measuring instrument, and means operatively connecting said film speed indicating means with said operative connection for automatically modifying the operation thereof in accordance with said film speed indicating means and superimposing a corresponding modifying action on said measuring instrument when said film containing member is inserted into said compartment of said camera casing, said operative connection including an axially movable pin (28) one end of which is engaged by a cam on said shutter speed adjusting means (27) the other end of said pin engaging one end of a pivotally mounted lever (29) carrying pivotally between its ends another lever (33), one end of which is operatively connected with said film speed indicating means on said film containing member when the latter is inserted in the camera casing, while the other end of said last named lever is operatively connected with a toothed segment and pinion mechanism (42, 43) which rotates said measuring instrument.

References Cited
UNITED STATES PATENTS

| | | | |
|---|---|---|---|
| 3,025,777 | 3/1962 | Wilkenson | 95—10 |
| 3,125,939 | 3/1964 | Bundschuh et al. | 95—10 |
| 3,194,132 | 7/1965 | Nerwin | 95—10 |
| 3,261,273 | 7/1966 | Broschke | 95—10 |
| 3,309,975 | 3/1967 | Kremp et al. | 95—10 |

NORTON ANSHER, *Primary Examiner.*

J. F. PETERS, *Assistant Examiner.*